United States Patent
Kim et al.

(10) Patent No.: US 10,634,251 B2
(45) Date of Patent: Apr. 28, 2020

(54) MULTI-LAYER GASKET ASSEMBLY

(71) Applicant: Federal-Mogul Corporation, Southfield, MI (US)

(72) Inventors: Tae Kim, Evanston, IL (US); Steven Kueltzo, Aurora, IL (US); Rich Larson, Des Plaines, IL (US); Wilford Dean Virgin, Spring Grove, IL (US)

(73) Assignee: Tenneca Inc., Lake Forest, IL (US)

( * ) Notice: Subject to any disclaimer, the term of this patent is extended or adjusted under 35 U.S.C. 154(b) by 961 days.

(21) Appl. No.: 14/464,161

(22) Filed: Aug. 20, 2014

(65) Prior Publication Data
US 2016/0053716 A1    Feb. 25, 2016

(51) Int. Cl.
F16J 15/08    (2006.01)

(52) U.S. Cl.
CPC .... F16J 15/0825 (2013.01); *F16J 2015/0856* (2013.01); *F16J 2015/0875* (2013.01)

(58) Field of Classification Search
CPC ............... F16J 15/0818; F16J 15/0887; F16J 2015/0875; F16J 2015/085; F16J 2015/0856; F16J 2015/0862
USPC ........................................................ 277/593
See application file for complete search history.

(56) References Cited

U.S. PATENT DOCUMENTS

| | | | | |
|---|---|---|---|---|
| 4,799,695 A * | 1/1989 | Yoshino | ............... | F16J 15/0806 277/591 |
| 5,286,039 A * | 2/1994 | Kawaguchi | .......... | F16J 15/0825 277/593 |
| 5,431,418 A * | 7/1995 | Hagiwara | ............ | F16J 15/0825 277/592 |
| 5,628,518 A * | 5/1997 | Ushio | .................. | F16J 15/0825 277/593 |
| 7,200,932 B2 * | 4/2007 | Wade | ..................... | F02F 11/002 219/121.64 |
| 9,939,066 B2 * | 4/2018 | Okano | ................. | F16J 15/0825 |
| 2002/0175478 A1 * | 11/2002 | Hilgert | ................. | F16J 15/0825 277/591 |
| 2003/0042689 A1 * | 3/2003 | Diez | .................... | F16J 15/0825 277/593 |
| 2004/0041352 A1 * | 3/2004 | Hohe | ................... | F16J 15/0818 277/593 |
| 2005/0189724 A1 * | 9/2005 | Schmitz | ............... | F16J 15/0825 277/592 |
| 2006/0232017 A1 * | 10/2006 | Hamada | ................. | F02F 11/002 277/594 |
| 2007/0090608 A1 * | 4/2007 | Ueta | .................... | F16J 15/0818 277/593 |

(Continued)

*Primary Examiner* — Nathan Cumar
(74) *Attorney, Agent, or Firm* — Robert L. Stearns; Dickinson Wright, PLLC

(57) ABSTRACT

An improved multi-layer gasket assembly is provided. The gasket assembly includes a plurality of metal gasket layers which have at least one set of axially aligned openings. The plurality of layers includes at least two functional layers, at least one distance layer and at least one stopper layer. Each of the functional layers has at least one embossment bead that is spaced radially from the openings, and the distance and stopper layers are sandwiched between the functional layers. At least one of the stopper and the distance layer has a polymeric coating applied to at least a portion of an exterior surface thereof, and the stopper and distance layers are laser welded together through the polymeric coating.

12 Claims, 3 Drawing Sheets

(56) References Cited

U.S. PATENT DOCUMENTS

| | | | |
|---|---|---|---|
| 2008/0048402 A1* | 2/2008 | Sailer | F16J 15/0825 277/627 |
| 2009/0189359 A1* | 7/2009 | Yoshijima | F16J 15/0825 277/591 |
| 2012/0126491 A1* | 5/2012 | Schmitt | F16J 15/0825 277/593 |
| 2012/0223486 A1* | 9/2012 | Lesnau, IV | F16J 15/0825 277/593 |
| 2012/0261889 A1* | 10/2012 | Henne | F16J 15/0825 277/593 |
| 2013/0320630 A1* | 12/2013 | Okano | F16J 15/0825 277/592 |

* cited by examiner

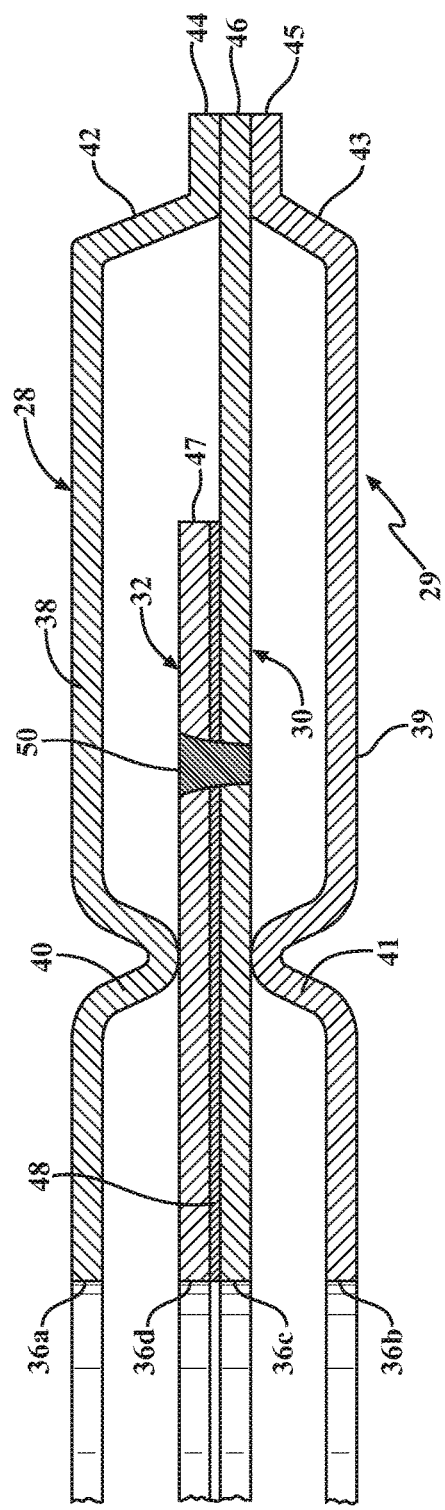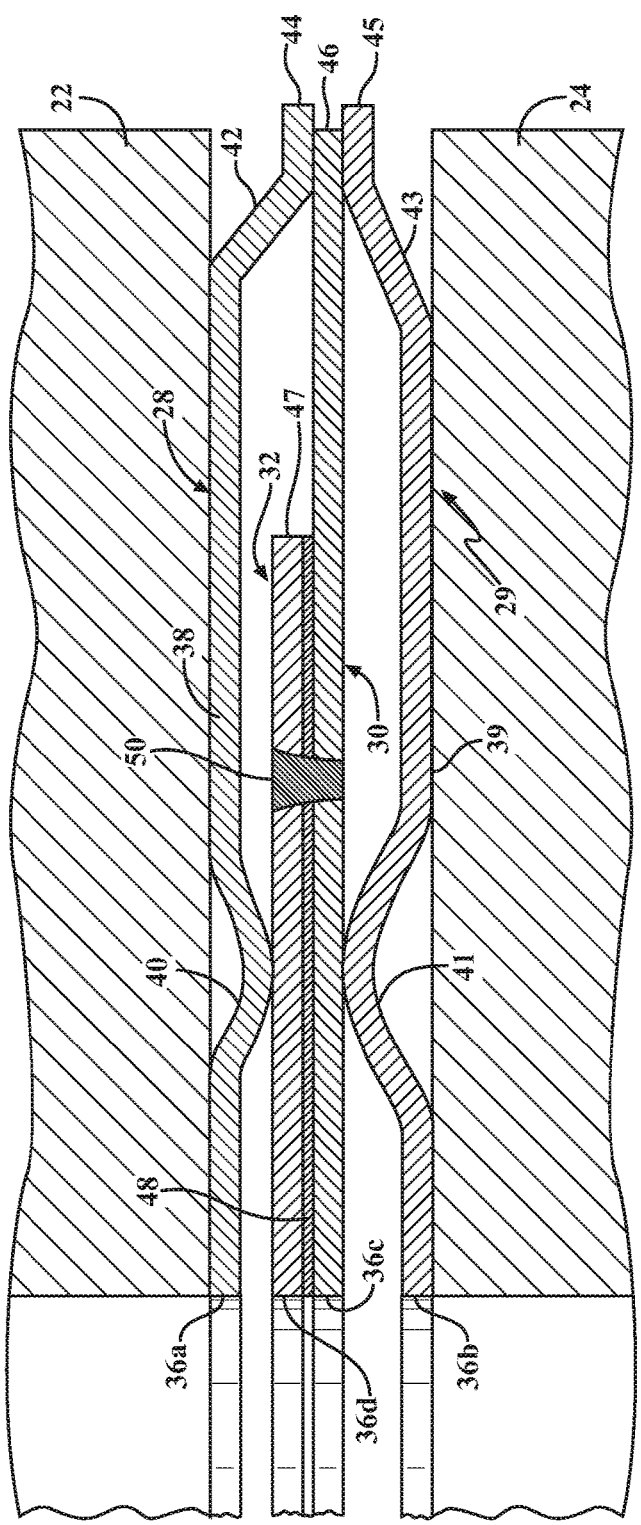

MULTI-LAYER GASKET ASSEMBLY

BACKGROUND OF THE INVENTION

1. Field of the Invention

The subject invention relates to multi-layered gasket assemblies for internal combustion engines and to a method of manufacturing such a multi-layered gasket assembly.

2. Related Art

Multi-layered gaskets are often used to form a seal between two mating surfaces of a mechanical system or device, such as an internal combustion engine, to prevent leakage of combustion gasses, cooling water, lubricating oil, and the like. One common application involves placing the multi-layered gasket between an engine block and a cylinder head of the internal combustion engine. Such cylinder head gaskets typically extend around a plurality of cylinder bores in an engine block to seal high-pressure combustion gasses within the cylinder bores as well as to seal oil and coolant passages. Once installed, the multi-layered steel gaskets assembly bears the load from a bolted connection of the engine components and relies upon this load to provide adequate seal therebetween. One common problem with some multi-layer gasket assemblies is inadequate sealing during cold conditions, i.e., before the engine has had a chance to warm up.

SUMMARY OF THE INVENTION

According to one aspect of the present invention, an improved multi-layer gasket assembly is provided. The gasket assembly includes a plurality of metal gasket layers which have at least one set of axially aligned openings. The plurality of layers includes at least two functional layers, at least one distance layer and at least one stopper layer. Each of the functional layers has at least one embossment bead that is spaced radially from the openings, and the distance and stopper layers are sandwiched between the functional layers. At least one of the stopper and the distance layers has a polymeric coating applied to at least a portion of an exterior surface thereof, and the stopper and distance layers are laser welded together through the polymeric coating.

The improved multi-layer gasket assembly is advantageous when used as a cylinder head gasket to establish a fluid tight seal around a cylinder bore of an internal combustion engine because it provides for improved sealing performance in cold conditions, i.e., before the engine has warmed up. Specifically, the polymeric coating between the distance and stopper layers provides a biasing force against the embossment beads of the functional layers to improve the seal that is established by the embossment beads. This improved performance is achieved with very little additional cost due to the laser weld, which extends through the polymeric coating.

According to another aspect of the present invention, the polymeric coating is of polytetrafluoroethylene (PTFE), silicone, nitrile rubber or Fluoroelastomer.

According to yet another aspect of the present invention, each of the functional layers has a generally flat portion, and the full embossment bead extends axially from the generally flat portion.

According to still another aspect of the present invention, the at least two functional layers is only two functional layers, and the embossment beads of the two functional layers extend from the generally flat portions towards one another.

According to yet a further aspect of the present invention, each of the functional layers further includes a half bead that is spaced radially from the respective full embossment bead, and the half beads of the functional layers extend towards one another.

According to still a further aspect of the present invention, each of the functional layers extends radially from the openings to a respective distal outer periphery, and the stopper layer extends from the openings to an end that is located radially between the full embossment beads of the functional layers and the distal outer peripheries of the functional layers.

Another aspect of the present invention is a method of making a multi-layer gasket assembly. The method includes the step of preparing a distance layer and a stopper layer, at least one of the distance and stopper layers being at least partially coated with a polymeric material. The method proceeds with the step of positioning the distance and stopper layers relative to one another such that the polymeric coating is sandwiched between the distance and stopper layers. The method continues with the step of melting material of the distance layer and of the stopper layer and of the polymeric coating with a laser beam and allowing the melted materials to cool to form a weld joint between the distance and stopper layers that extends through the polymeric coating. The method continues with the step of positioning the distance and stopper layers between at least two functional layers; each of the functional layer having at least one full embossment bead; and wherein the functional layers, the distance layer and the stopper layer have at least one set of coaxial through openings.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 2 is a cross-sectional and fragmentary view of the exemplary embodiment of the multi-layer gasket assembly in an unstressed condition;

FIG. 3 is a cross-sectional and fragmentary view of the exemplary embodiment of the multi-layer gasket assembly as compressed between an engine block and a cylinder head of the internal combustion engine;

DESCRIPTION OF THE ENABLING EMBODIMENT

Figure 1:
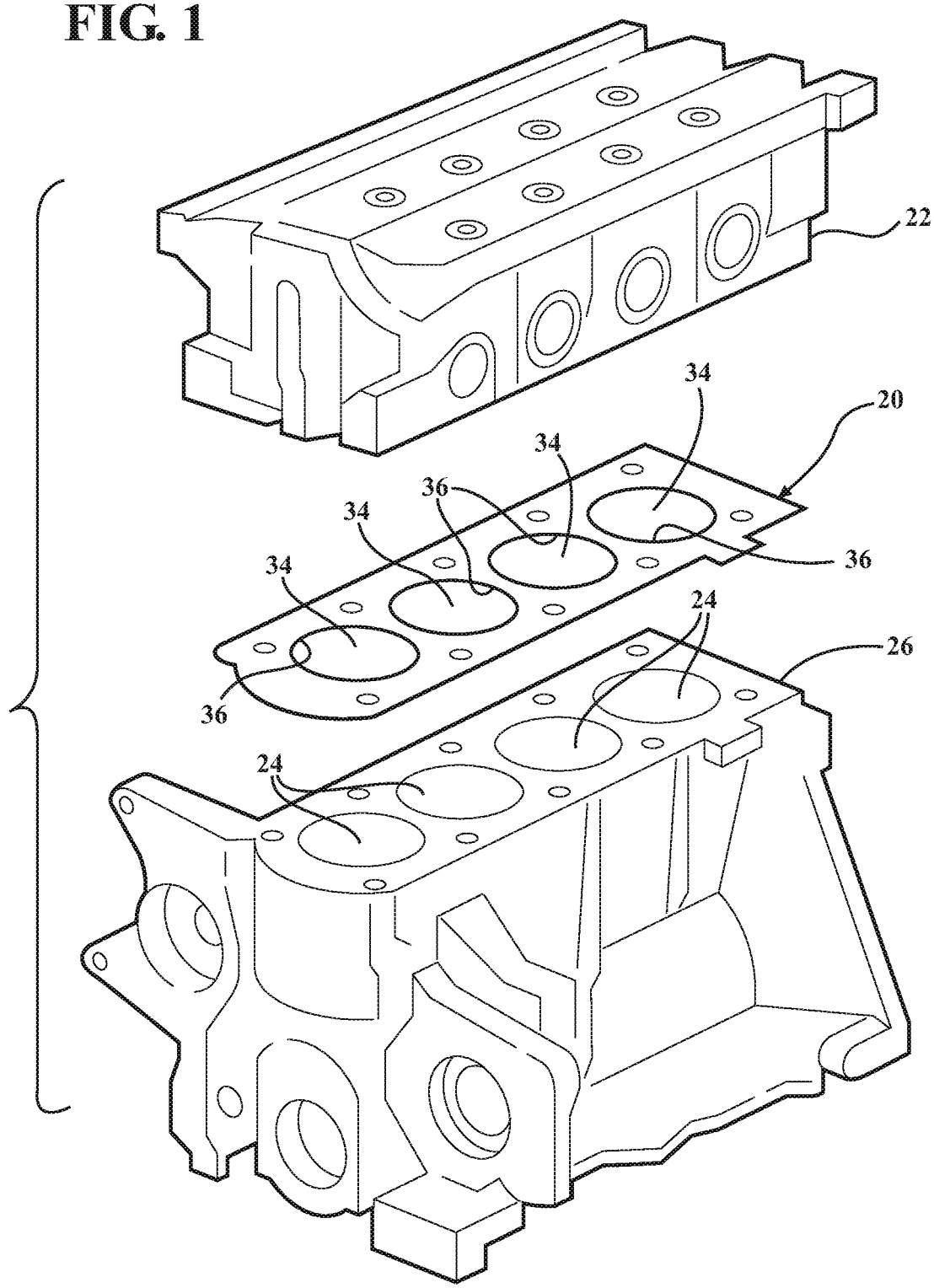
FIG. 1 is an exploded view showing an internal combustion engine including an exemplary embodiment of a multi-layer gasket assembly.
Figure 4:
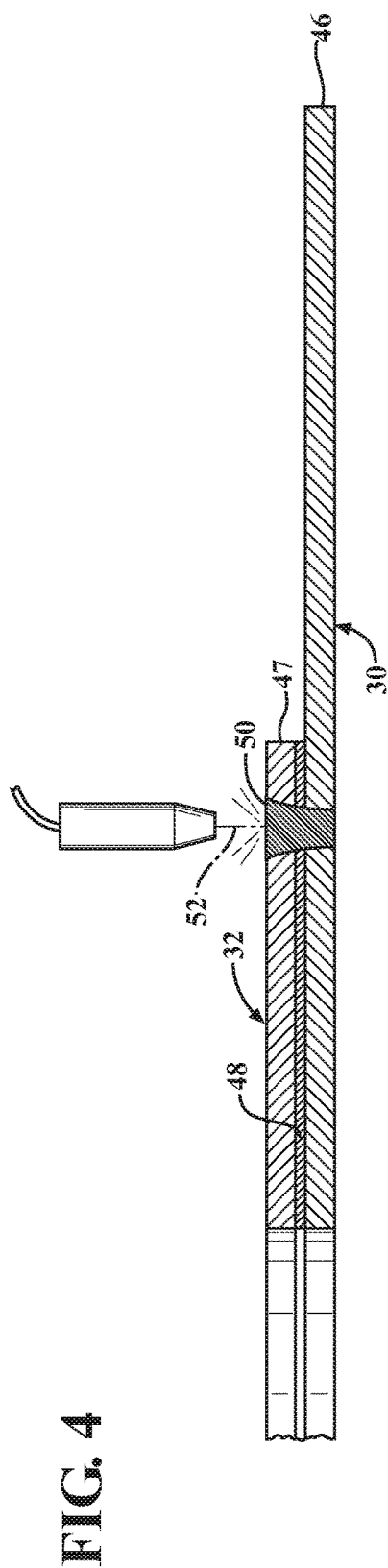
FIG. 4 is a cross-sectional and fragmentary view of a distance layer and a stopper layer being joined together through a laser welding process.

Referring to the Figures, wherein like numerals indicate corresponding parts throughout the several views, an exemplary embodiment of a multi-layer gasket assembly 20 for establishing a seal between a first member and a second member is generally shown in FIG. 1. In the exemplary embodiment, the multi-layer gasket assembly 20 is a cylinder head 22 gasket which is configured to establish gas and fluid tight seals around a plurality of cylinder bores 24 and between an engine block 26 and a cylinder head 22 and to maintain that seal during operation of the engine when the cylinder head 22 may lift off of the engine block 26 in response to a fuel and air combustion within the cylinder bores 24. However, it should be appreciated that the multi-layer gasket assembly 20 could find uses in a range of other vehicular or non-vehicular applications. For example, the multi-layer gasket assembly 20 could be configured to seal an exhaust manifold (not shown) to an engine block 26.

Referring now to FIGS. 1 and 2, the multi-layer gasket includes a plurality of separate gasket layers 28, 29, 30, 32 which are overlayed on top of one another in a stacking relationship, and each gasket layer has a plurality of openings 34 which are aligned with the combustion bores of the engine block 26 and an inner periphery 36a, 36b, 36c, 36d which surrounds each of the openings 34. In the exemplary embodiment, the plurality of gasket layers 28, 29, 30, 32 includes a pair of functional layers 28, 29, a distance layer 30 and a stopper layer 32. The gasket layers 28, 29, 30, 32 are positioned such that the upper-most and lower-most gasket layers 28, 29 are the two functional layers 28, 29, and the distance and stopper layers 30, 32 are sandwiched between the two functional layers 28, 29. Each of the gasket layers 28, 29, 30, 32 is preferably made of steel or a steel alloy. However, any suitable material may be employed.

In FIG. 2, the exemplary multi-layer gasket assembly 20 is shown in an unstressed condition. As shown, the functional layers 28, 29 are shaped as mirror images of one another. Each of the exemplary functional layers 28, 29 has a generally flat portion 38, 39 and at least one full embossment bead 40, 41 that is spaced from the respective inner periphery 36a, 36b and surrounds one of the openings. As shown, each of the full embossment beads 40, 41 is spaced radially from its respective inner periphery 36a, 36b. The functional layers 28, 29 are oriented such that the full embossment beads 40, 41 face towards one another, i.e., the full embossment bead 40 of the upper functional layer 28 extends downwardly and the full embossment bead 42 of the lower functional layer 29 extends upwardly. Each of the functional layers 28, 29 also has a half bead 42, 43 which is spaced radially from the respective full embossment bead 40, 41 on the opposite side of the full embossment bead 40, 41 from the inner periphery 36a, 36b. Similar to the full embossment beads 40, 41, the half beads 42, 43 of the two functional layers 28, 29 extend towards one another. Each of the functional layers 28, 29 extends radially from its respective inner periphery 36a, 36b to a functional layer distal outer periphery 44, 45.

In the exemplary embodiment, the distance layer 30 is formed as a generally flat piece of material and extends from the inner periphery 36c to a distance layer outer periphery 46 that is aligned with the functional layer outer peripheries 44, 45. The stopper layer 32 is also generally flat and extends from the inner periphery 36 to a stopper layer end 47 that is located radially between the full embossment beads 40, 41 and the half beads 42, 43 of the functional layers 28, 29. The stopper layer 32 is positioned above the distance layer 30. As such, when the multi-layer gasket assembly 20 is clamped between an engine block 26 and a cylinder head 22, as shown in FIG. 3, the full embossment bead 40 of the upper functional layer 28 is biased against the stopper layer 32, and the full embossment bead 41 of the lower functional layer 29 is biased against the distance layer 30.

A coating 48 of a polymer material is applied to the stopper layer 32 and/or to the distance layer 30 between the distance and stopper layers 30, 32. In the exemplary embodiment, the coating 48 extends only along the length of the stopper layer 32 from the inner periphery 36d of the stopper layer 32 to the stopper layer end 47. The polymeric coating 48 is preferably of polytetrafluoroethylene (PTFE), silicone, nitrile rubber (NBR) or Fluoroelastomer (FKM). The polymeric coating 48 may be applied to the distance and/or stopper layers 30, 32 through any suitable process.

Figure 5:
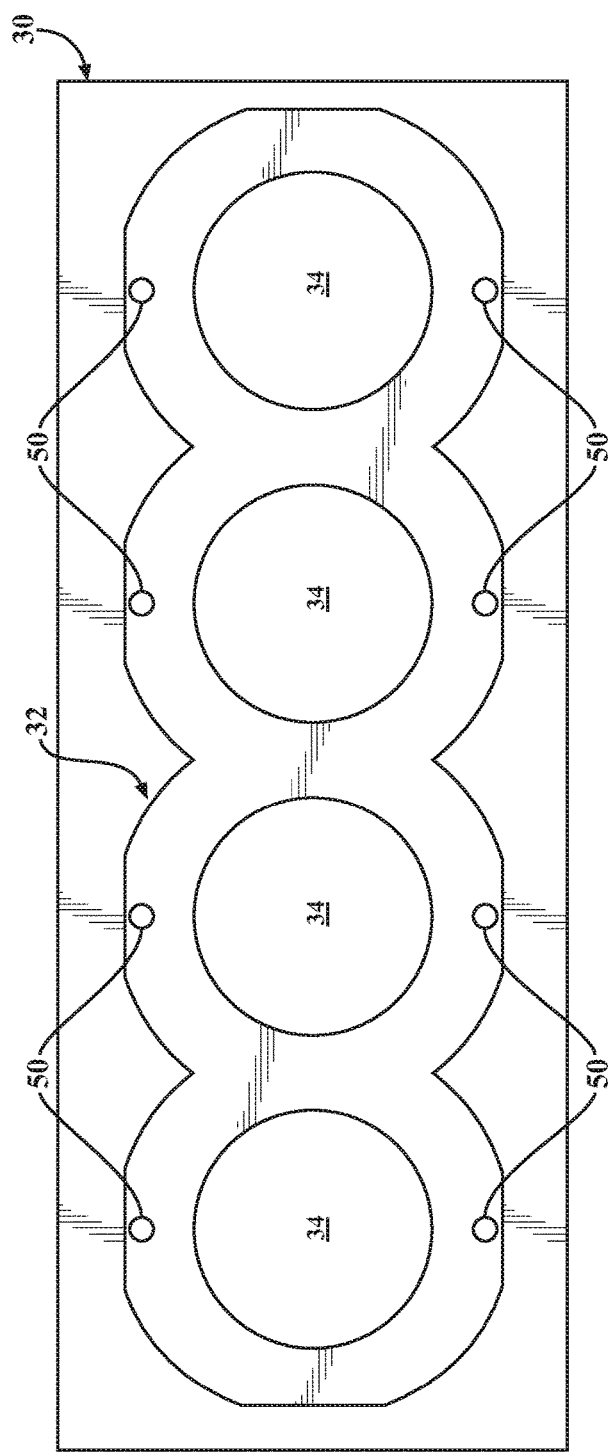
FIG. 5 is a top elevation view showing the distance and stopper layers of the exemplary embodiment of the multi-layer gasket assembly.

Referring now to FIGS. 2-5, the distance and stopper layers 30, 32 are interconnected with one another through at least one weld joint 50 which is formed through a laser welding process. As shown in FIG. 5, in the exemplary embodiment, the distance and stopper layers 30, 32 are welded together in eight distinct and spaced apart weld joints 50, with two of the weld joints 50 being located diametrically opposite of one another across from each of the openings 34. Referring back to FIGS. 2-4, the weld joint 50 extends through the polymeric coating 48. In the exemplary embodiment, the weld joint 50 is located radially on the opposite side of the full embossment bead 40 of the functional layers 28, 29 from the opening 34 such that it does not interfere with the seals established between the functional layers 28, 29 and the distance and stopper layers 30, 32. However, it should be appreciated that the weld joint could alternately be disposed radially between the full embossment bead and the opening.

During initial operation of the internal combustion engine before it has warmed up, the polymeric coating 48 exhibits a biasing force to bias the distance and stopper layers 30, 32 against the full embossment beads 40 of the functional layers 28. This ensures that a gas and fluid tight seal is established around the cylinder bores 24 to prevent combustion gasses from leaking out of the cylinder bores 24 and interfering with other parts of the engine.

Another aspect of the present invention provides for a method of making a multi-layer gasket assembly 20. The method includes the step of preparing a distance layer 30 and a stopper layer 32 with the distance and/or stopper layer 30, 32 being at least partially coated with a polymeric coating 48. The method proceeds with the step of positioning the distance and stopper layers 30, 32 such that the polymeric coating 48 is sandwiched therebetween. The method continues with the step of melting material of the distance and stopper layers 30, 32 and also of the polymeric coating 48 with a laser beam 52 to form a weld joint 50 between the distance and stopper layers 30, 32 that extends through the polymeric coating 48. The method proceeds with the step of positioning the distance and stopper layers 30, 32 between at least two functional layers 28, 29, each of the functional layers 28, 29 having at least one full embossment bead 40, 41. The functional layers 28, 29 and the distance and stopper layers 30, 32 have at least one set of coaxial through openings 34.

Obviously, many modifications and variations of the present invention are possible in light of the above teachings and may be practiced otherwise than as specifically described while within the scope of the appended claims.

What is claimed is:

1. A multi-layer gasket assembly, comprising:
a plurality of metal gasket layers having at least one set of axially aligned openings;
said plurality of gasket layers including at least two functional layers and at least one distance layer and at least one stopper layer, each of said functional layers having at least one embossment bead spaced radially from said openings, and said distance and stopper layers being sandwiched between said functional layers;

at least one of said stopper layer and said distance layer having a polymeric coating applied to at least a portion of an exterior surface thereof; and said stopper and distance layers being laser welded together to define a weld joint that extends through said at least one stopper layer, said distance layer, and said polymeric coating, wherein the weld joint includes materials of said at least one stopper layer, said distance layer, and said polymeric coating.

2. The multi-layer gasket assembly as set forth in claim 1 wherein said polymeric coating is of silicone, nitrile rubber or Fluoroelastomer.

3. The multi-layer gasket assembly as set forth in claim 2 wherein said polymeric coating is of silicone.

4. The multi-layer gasket assembly as set forth in claim 1 wherein each of said functional layers has a generally flat portion and wherein said full embossment bead extends axially from said generally flat portion.

5. The multi-layer gasket assembly as set forth in claim 4 wherein said at least two functional layers is only two functional layers.

6. The multi-layer gasket assembly as set forth in claim 5 wherein said embossment beads of said two functional layers extend from said respective generally flat portions towards one another.

7. The multi-layer gasket assembly as set forth in claim 5 wherein each of said functional layers further includes a half bead that is spaced radially from said full embossment bead.

8. The multi-layer gasket assembly as set forth in claim 7 wherein said half beads of said functional layers extend towards one another.

9. The multi-layer gasket assembly as set forth in claim 1 wherein said functional layers extend radially from said openings to a distal outer periphery.

10. The multi-layer gasket assembly as set forth in claim 9 wherein said stopper layer extends radially from said opening to an end that is located radially between said full embossment beads of said functional layers and said distal outer peripheries of said functional layers.

11. The multi-layer gasket assembly as set forth in claim 1 wherein said at least one distance layer and said at least one distance layer are generally flat from an inner periphery to an outer periphery.

12. The multi-layer gasket assembly as set forth in claim 1 wherein said polymeric coating extends along a full distance from an inner periphery of said stopper layer to an outer periphery of said stopper layer.

* * * * *

UNITED STATES PATENT AND TRADEMARK OFFICE
CERTIFICATE OF CORRECTION

PATENT NO. : 10,634,251 B2  
APPLICATION NO. : 14/464161  
DATED : April 28, 2020  
INVENTOR(S) : Tae Kim et al.

Page 1 of 1

It is certified that error appears in the above-identified patent and that said Letters Patent is hereby corrected as shown below:

On the Title Page

Item [73], delete "TENNECA INC" and insert -- TENNECO INC --.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*